(12) United States Patent
Arakawa et al.

(10) Patent No.: US 8,934,537 B2
(45) Date of Patent: Jan. 13, 2015

(54) VIDEO CODING DEVICE AND VIDEO CODING METHOD

(75) Inventors: Hiroshi Arakawa, Nara (JP); Hideyuki Ohgose, Osaka (JP)

(73) Assignee: Panasonic Corporation, Osaka (JP)

( * ) Notice: Subject to any disclaimer, the term of this patent is extended or adjusted under 35 U.S.C. 154(b) by 302 days.

(21) Appl. No.: 12/738,886

(22) PCT Filed: Oct. 3, 2008

(86) PCT No.: PCT/JP2008/002785
§ 371 (c)(1),
(2), (4) Date: Apr. 20, 2010

(87) PCT Pub. No.: WO2009/057249
PCT Pub. Date: May 7, 2009

(65) Prior Publication Data
US 2010/0220782 A1   Sep. 2, 2010

(30) Foreign Application Priority Data

Oct. 29, 2007   (JP) ................................ 2007-280729

(51) Int. Cl.
*H04N 7/26*   (2006.01)
*H04N 19/152*  (2014.01)
(Continued)

(52) U.S. Cl.
CPC ... *H04N 19/00266* (2013.01); *H04N 19/00193* (2013.01); *H04N 19/00951* (2013.01); *H04N 19/00781* (2013.01); *H04N 19/0009* (2013.01)
USPC ...... 375/240.02; 382/244; 382/247; 382/251; 382/238; 382/166; 382/239; 382/235; 375/240.03; 375/240.07; 341/51

(58) Field of Classification Search
None
See application file for complete search history.

(56) References Cited

U.S. PATENT DOCUMENTS 6,714,592 B1 * 3/2004 Liu et al. .................. 375/240.13
2003/0174771 A1 * 9/2003 Sugahara et al. ........ 375/240.03
(Continued)

FOREIGN PATENT DOCUMENTS

| JP | 2006-033014 | 2/2006 |
| JP | 2007-124122 | 5/2007 |
| JP | 2007-158430 | 6/2007 |

OTHER PUBLICATIONS

International Search Report issued Jan. 13, 2009 in International (PCT) Application No. PCT/JP2008/002785.
(Continued)

*Primary Examiner* — Joseph Ustaris
*Assistant Examiner* — William Adrovel
(74) *Attorney, Agent, or Firm* — Wenderoth, Lind & Ponack, L.L.P.

(57) ABSTRACT

A video coding device includes a buffer simulation unit that calculates an occupation amount of a virtual buffer to be used for controlling a coding amount, by using, for each picture, (a) a code length of a code that is an intermediate result of compression coding and (b) a code length of a compressed code that is a final result of the compression coding. This means that, for a picture that has not yet processed by an arithmetic coding unit, an occupation amount of the virtual buffer is calculated by using a code length of codes provided from a binarization unit.

2 Claims, 6 Drawing Sheets

(51) Int. Cl.
*H04N 19/91* (2014.01)
*H04N 19/172* (2014.01)
*H04N 19/61* (2014.01)
*H04N 19/124* (2014.01)

(56) References Cited

U.S. PATENT DOCUMENTS

| | | |
|---|---|---|
| 2006/0165165 A1 | 7/2006 | Mohsenian |
| 2006/0280371 A1* | 12/2006 | Shimazaki et al. ........... 382/239 |
| 2007/0025441 A1* | 2/2007 | Ugur et al. ............... 375/240.03 |
| 2010/0172593 A1* | 7/2010 | Chono ........................ 382/246 |
| 2013/0058398 A1* | 3/2013 | Jiang et al. ............... 375/240.03 |

OTHER PUBLICATIONS

ITU-T H.264 (Mar. 2005): Infrastructure of audiovisual services—Coding of moving video, Advanced video coding for generic audiovisual services, including pp. i-xiv and 1-324.

Okubo et al., H.264/AVC Textbook <Excerpt>, Impress Corporation, 2004, with English translation (p. 181, Line 9-p. 190, Line 7).

* cited by examiner

VIDEO CODING DEVICE AND VIDEO CODING METHOD

TECHNICAL FIELD

The present invention relates to video coding devices and video coding method for coding video signals.

BACKGROUND ART

As with MPEG-2 does, H.264 scheme, which is one of video coding schemes, defines a conformance assurance method using a virtual buffer as a standard (refer to Non-Patent Reference 1).

In the conformance assurance method, an encoder side controls a real coding amount in order not to cause buffer underflow in a decoder side. Thereby, it is assured that discontinuity does not occur in reproducing by the decoder. For this control, the encoder prepares a virtual buffer that corresponds to a decoder buffer.

The above aspect is explained with reference to FIGS. 1 and 2. In FIG. 1, a video coding device 1000 is one example of conventional video coding devices. The conventional video coding device 1000 includes an image sorting unit 1001, an orthogonal transformation unit 1002, a quantization unit 1003, a lossless coding unit 1004, a rate control unit 1006, an inverse quantization unit 1007, an inverse orthogonal transformation unit 1008, a frame memory 1009, and a motion estimation/compensation unit 1010.

These units are elements included in a video coding device according to MPEG-2, H.264, or the like, and disclosed in detail in Non-Patent Reference 2, for example. Therefore, these units are not explained here.

The processing performed by a buffer simulation unit 1005 included in the video coding device 1000 is explained with reference to FIG. 2. Symbols in FIG. 2 have the following meanings.

R denotes an input bitrate provided to a decoder buffer.

B denotes a size of the decoder buffer.

F denotes a buffer occupation amount of a buffer from which a decoder retrieves the first picture.

D denotes a delay time occurred when the decoder retrieves the first picture from the buffer.

$t\_i$ denotes a display timing of a picture $\{i\}$ $b\_i$ denotes a coding amount of the picture $\{i\}$ (a result of calculating a coding amount outputted from the lossless coding unit 1004 on a picture-by-picture basis).

Here, a picture refers to a frame or a field.

Then, if $F\_i$ is assumed as a buffer occupation amount immediately before a picture coding amount $b\_i$ is retrieved at a timing $t\_i$, the following equations are established.

$$F\_0 = F \quad \text{(Equation 1)}$$

$$F\_{i+1} = \min(B, F\_i - b\_i + R \times (t\_{i+1} - t\_i)) \quad \text{(Equation 2)}$$

For a variable bitrate in MPEG-2, H.264, or the like, an encoder needs to perform coding in order to satisfy the following equation.

$$F\_i - b\_i \geq 0 \quad \text{(Equation 3)}$$

This equation means that "the buffer holds bits that are equal to or more than ($b\_i$) to be retrieved". If the conditions are satisfied, a decoder does not get the situation where necessary bits are not available in decoding. As a result, discontinuity does not occur in reproduced images.

[Non-Patent Reference 1] ITU-T H.264 (03/2005): Infrastructure of audiovisual services-Coding of moving video, Advanced video coding for generic audiovisual services

[Non-Patent Reference 2] "H.264/AVC Kyokasho", Okubo et., Impress Corporation, 2004

[Patent Reference 1] Japanese Unexamined Patent Application Publication No. 2006-33014

DISCLOSURE OF INVENTION

Problems that Invention is to Solve

Meanwhile, in Context-Adaptive Binary Arithmetic Coding (CABAC) among lossless coding methods employed in H.264, a probability estimation value used in binary arithmetic coding included in the CABAC depends on a result of immediately prior processing, and thereby processing needs to be performed one by one sequentially. As a result, processing ability depends on the number of processing cycles of a circuit, and existing hardware performance cannot complete processing for one picture within a time period required by other structure elements for one picture.

More specifically, in FIG. 1, the lossless coding unit 1004 cannot be operated in synchronization with other elements up to the lossless coding unit 1004 which are, for example, the orthogonal transformation unit 1002 and the quantization unit 1003. This means that the other elements start coding of a next picture before the lossless coding unit 1004 completes processing for a current picture.

However, since the buffer simulation unit 1005 requires a coding amount $b\_i$ of each picture provided from the lossless coding unit 1004, the buffer simulation unit 1005 cannot complete necessary processing. Thereby, the rate control unit 1006 also has a trouble of failing to calculate necessary calculation. As a result, the conventional structure cannot provide a video coding device with rate control (Problem 1).

In order to solve Problem 1, it has been conceived that an estimation coding amount of a real coding amount $b\_i$ that is an input of the buffer simulation unit 1005 is used instead of the real amount.

For instance, in a method disclosed in Patent Reference 2, a real coding amount occurred for a picture is controlled using an estimation coding amount on a macroblock-by-macroblock basis.

Therefore, it has further been conceived that an estimation coding amount for each macroblock used in this method is used as a real coding amount of a picture.

More specifically, an estimation coding amount is estimated before the lossless coding unit 1004 completes its processing, and the buffer simulation unit 1005 performs simulation of an occupation amount of a buffer (hereinafter, referred to also as "buffer simulation), based on the estimation coding amount, thereby addressing Problem 1.

Regarding the method of estimating an estimation coding amount, a different method is also disclosed in Patent Reference 3, for example.

[Patent Reference 2] Japanese Unexamined Patent Application Publication No. 2007-124122

[Patent Reference 3] Japanese Unexamined Patent Application Publication No. 2007-158430

However, since such an estimation coding amount has an error, accumulation of the errors would cause underflow in the buffer simulation.

In other words, the method using an estimation coding amount has a problem of failing to prevent underflow of a decoder buffer due to the influence of errors, and thereby an object of the conformance assurance is not achieved (Problem 2).

In order to address the above-described conventional problems, an object of the present invention is to provide a video coding device and a video coding method which can generate coded data that does not cause discontinuity in video in a decoder.

Means to Solve the Problems

In accordance with an aspect of the present invention for achieving the object, there is provided a video coding device that performs compression coding on pictures included in video signals, the video coding device includes a calculation unit configured to calculate an occupation amount of a virtual buffer to be used for controlling a coding amount, by using, for each of the pictures, (a) a code length of a code that is an intermediate result of the compression coding and (b) a code length of a compressed code that is a final result of the compression coding.

It is also possible that the calculation unit is configured to calculate an occupation amount of the virtual buffer by using (b) the code length of the compressed code that is the final result of the compression coding, and sequentially calculate an occupation amount of the virtual buffer by using (a) the code length of the code that is the intermediate result of the compression coding, the code length of the code being considered as a code length of the coding amount that is really occurred.

It is further possible that the video coding device further includes a lossless coding unit configured to perform binary arithmetic coding that is a part of the compression coding, wherein the lossless coding unit includes a binarization unit that performs binarization that is pre-processing in the binary arithmetic coding, and the calculation unit is configured to use a code provided from the binarization unit, as the code that is the intermediate result.

In accordance with another aspect of the present invention, there is provided a video coding method of performing compression coding on pictures included in video signals, the video coding method includes calculating an occupation amount of a virtual buffer to be used for controlling a coding amount, by using, for each of the pictures, (a) a code length of a code that is an intermediate result of the compression coding and (b) a code length of a compressed code that is a final result of the compression coding.

It is also possible that in the calculation, an occupation amount of the virtual buffer is calculated by using (b) the code length of the compressed code that is the final result of the compression coding, and sequentially an occupation amount of the virtual buffer is calculated by using (a) the code length of the code that is the intermediate result of the compression coding, the code length of the code being considered as a code length of the coding amount that is actuary occurred.

It is further possible that the video coding method further includes performing binary arithmetic coding that is a part of the compression coding, wherein the performing of binary arithmetic coding includes performing binarization as pre-processing, and in the calculating, a code generated in the performing of binarization is used as the code that is the intermediate result.

The present invention can be implemented also as an integration circuit including the characteristic units of the above-described video coding device.

Furthermore, the present invention can be implemented as: a program causing a computer to execute the above-described video coding method; and a recording medium on which the program is recorded. The program can be distributed by a transmission medium such as the Internet or a recording medium such as a Digital Versatile Disc (DVD).

Effects of the Invention

As described above, the present invention can provide a video coding device and a video coding method which can generate coded data that does not cause discontinuity in video in a decoder.

More specifically, in the video coding device and the video coding method according to the present invention, by using a code that is an intermediate result in the middle of compression coding, it is possible to perform buffer simulation at a timing when the buffer simulation is necessary.

More specifically, a real coding amount, which is really occurred after the buffer simulation, can be controlled by using a result of the buffer simulation which is obtained at an appropriate timing. As a result, it is possible to generate coded data that does not cause underflow of a buffer (hereinafter, referred to also as "buffer underflow") in a decoder, in other words, coded data that does not cause discontinuity in video.

In addition, by performing the control using an upper limit of a real coding amount, such as an amount of codes generated by binarization, it is possible to prevent buffer underflow due to estimation errors.

Moreover, by considering also an already-known actual coding amount that is a final result of compression coding, it is possible to prevent excessive restriction on coding amounts.

NUMERICAL REFERENCES 100 video coding device
101 binarization unit
102 arithmetic coding unit
103 buffer simulation unit
104 buffer
1001 image sorting unit
1002 orthogonal transformation unit
1003 quantization unit
1004 lossless coding unit
1006 rate control unit
1007 inverse quantization unit
1008 inverse orthogonal transformation unit
1009 frame memory
1010 motion estimation/compensation unit

BEST MODE FOR CARRYING OUT THE INVENTION

The following describes an embodiment of the present invention with reference to the drawings.

Figure 1:
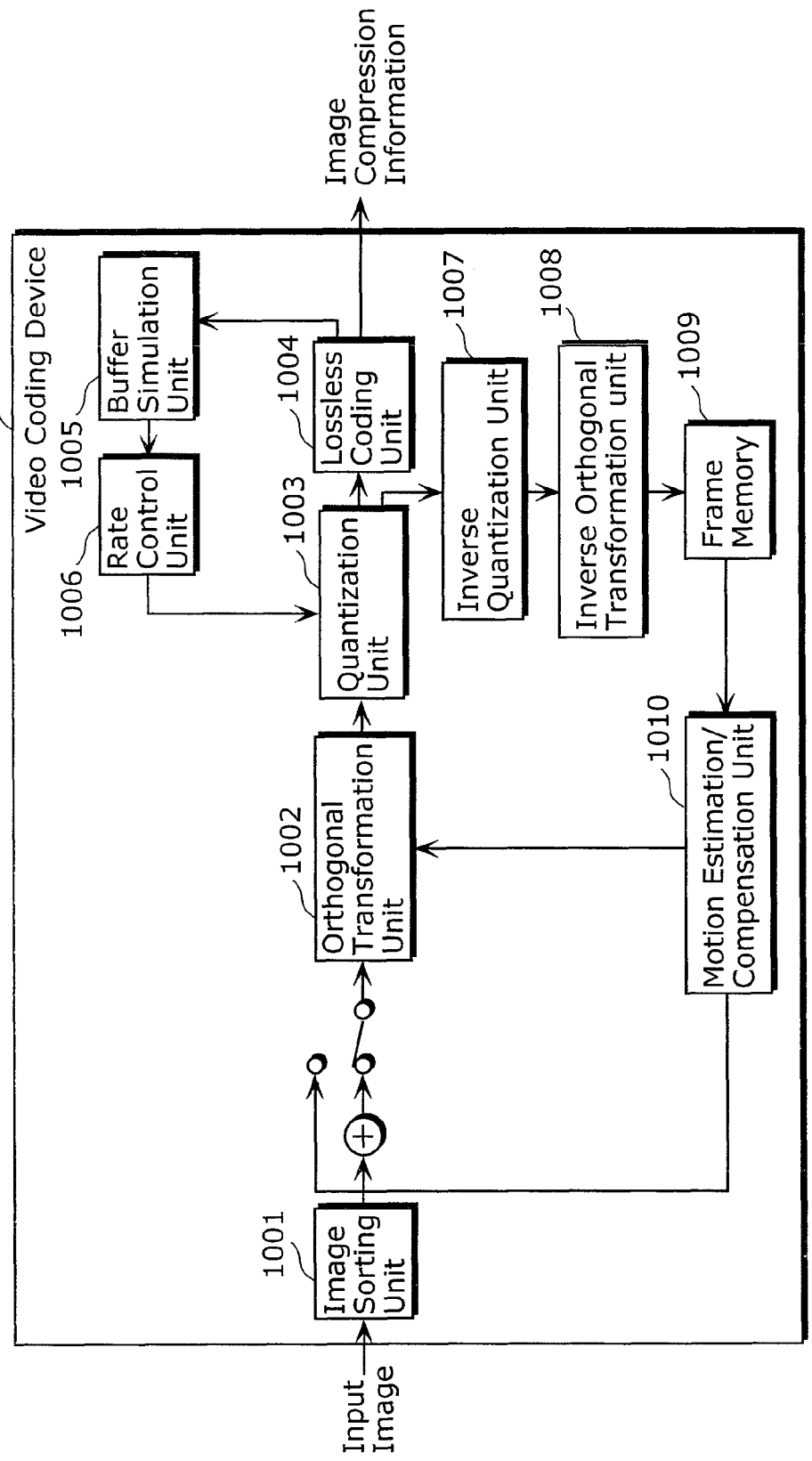
FIG. 1 is a block diagram showing a functional structure of a conventional video coding device.
Figure 2:
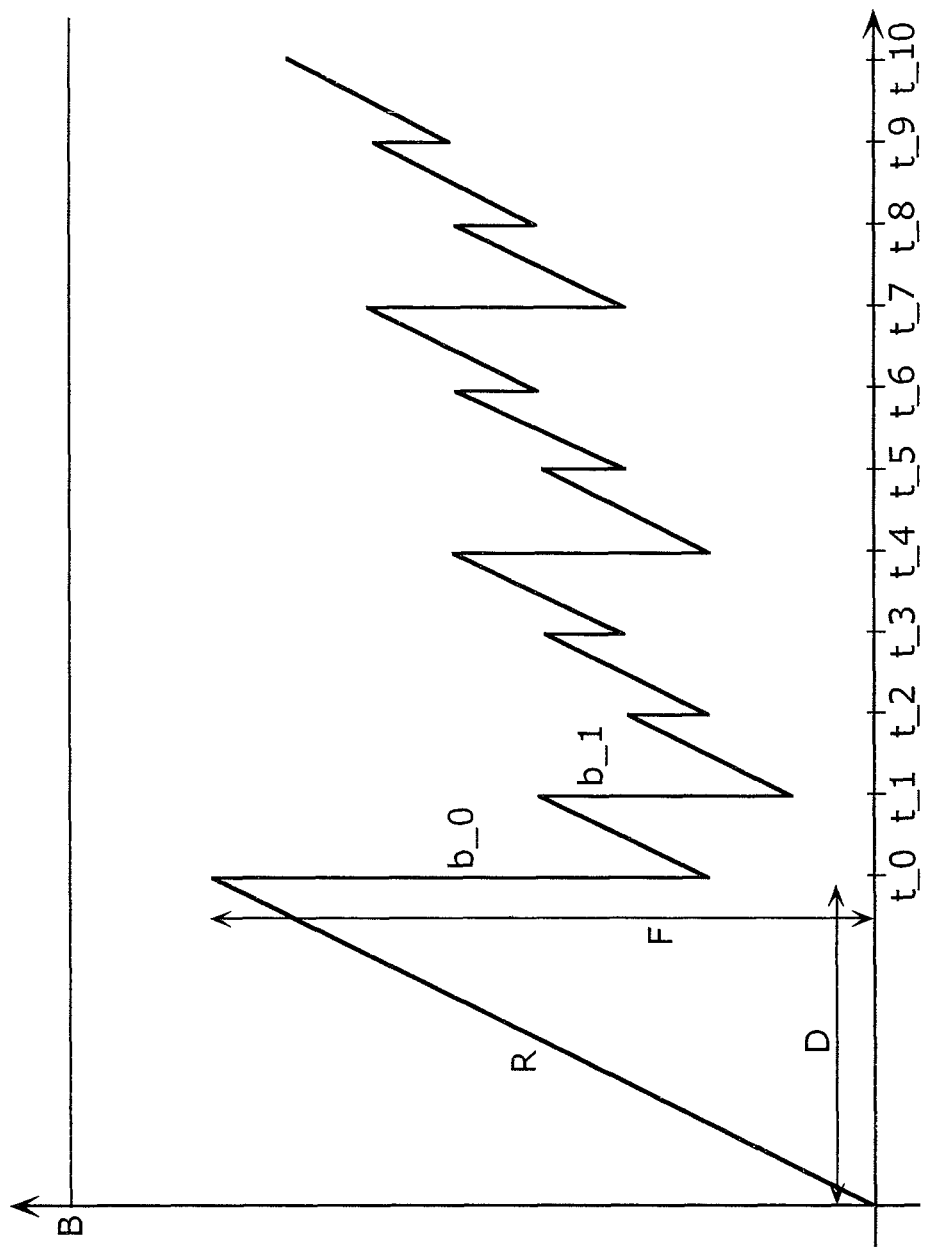
FIG. 2 is a graph plotting an example of a result of simulation performed by a buffer simulation unit of the conventional video coding device.
Figure 3:
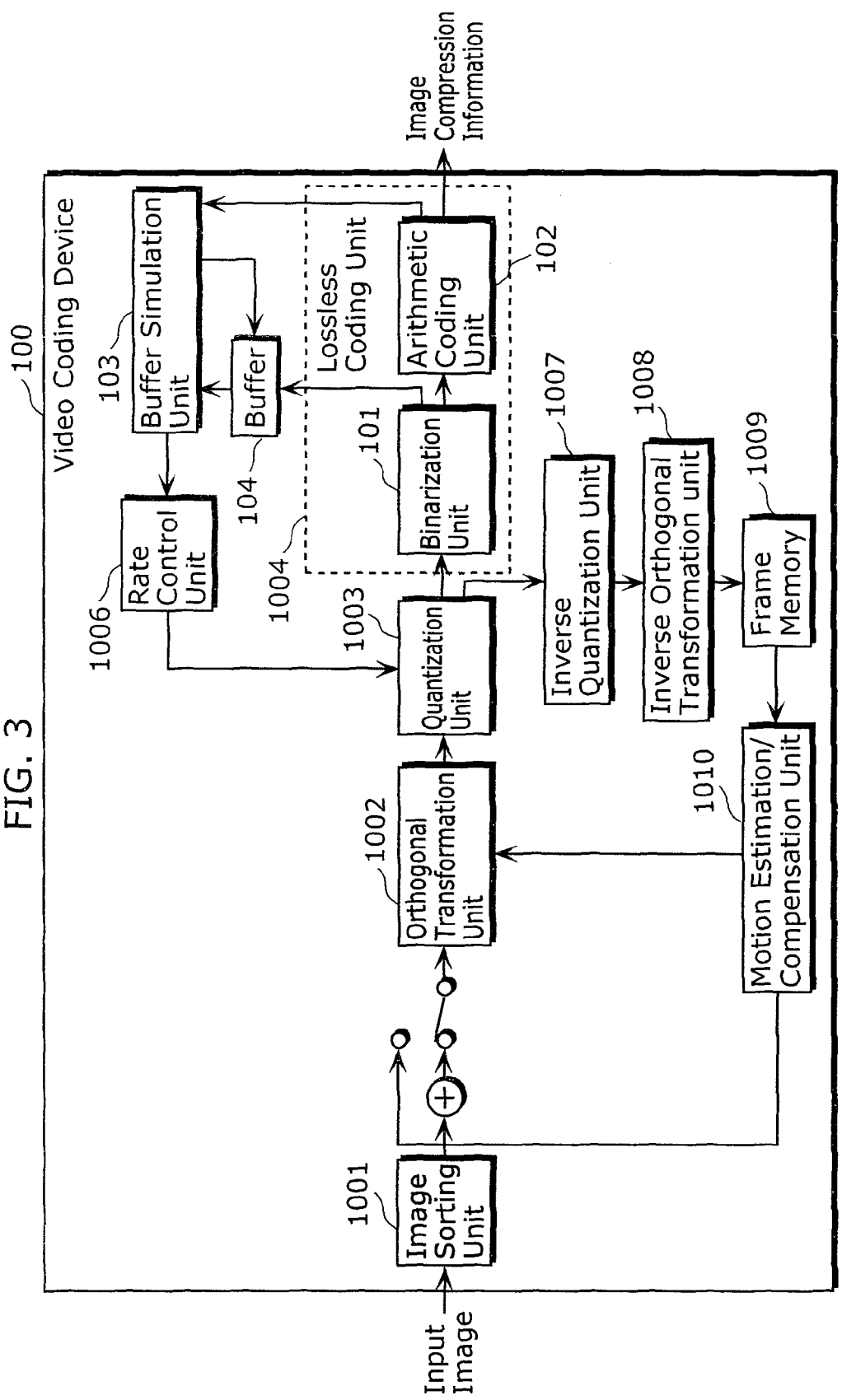
FIG. 3 is a block diagram showing a functional structure of a video coding device according to the embodiment of the present invention.

FIG. 3 is a block diagram showing a functional structure of a video coding device 100 according to the embodiment of the present invention.

The video coding device 100 includes an image sorting unit 1001, an orthogonal transformation unit 1002, a quantization unit 1003, a lossless coding unit 1004, a rate control unit 1006, an inverse quantization unit 1007, an inverse orthogonal transformation unit 1008, a frame memory 1009, and a motion estimation/compensation unit 1010.

These units are elements included in video coding devices employing MPEG-2, H.264, or the like, and disclosed in detail in Non-Patent Reference 2, for example. Therefore, these units are not explained in this description.

The lossless coding unit 1004 is a processing unit which performs binary arithmetic coding. The binary arithmetic coding is a part of compression coding for video signals performed by the video coding device 100. In more detail, the lossless coding unit 1004 includes an binarization unit 101 and an arithmetic coding unit 102.

The binarization unit 101 and the arithmetic coding unit 102 are processing units which perform CABAC employed in H.264. The details of these units are disclosed in Non-Patent Reference 1 and Non-Patent Reference 2.

The buffer simulation unit 103 has the same function as the function of the buffer simulation unit 1005 which has been described previously regarding the conventional technology. The buffer simulation unit 103 according to the present embodiment further has a function of performing buffer simulation by using binary (BIN) amounts provided from the binarization unit 101 and actual coding amounts provided from the arithmetic coding unit 102.

It should be noted that the buffer simulation unit 103 is an example of the calculation unit included in the video coding device according to the aspect of the present invention.

In this description, a BIN amount refers to a total bit number of a data sequence for one picture, among binary data provided from the binarization unit 101 to the arithmetic coding unit 102. In other words, a BIN amount is a per-picture amount of codes that are an intermediate result of compression coding.

On the other hand, the actual coding amount refers to a total bit number of a data sequence for one picture, among image compression information provided from the arithmetic coding unit 102. In other words, an actual coding amount is a per-picture amount of compressed codes that are a final result of the compression coding.

The buffer 104 holds a BIN amount for each picture. The processing performed by the buffer 104 is described with reference to FIG. 4.

Figure 4:
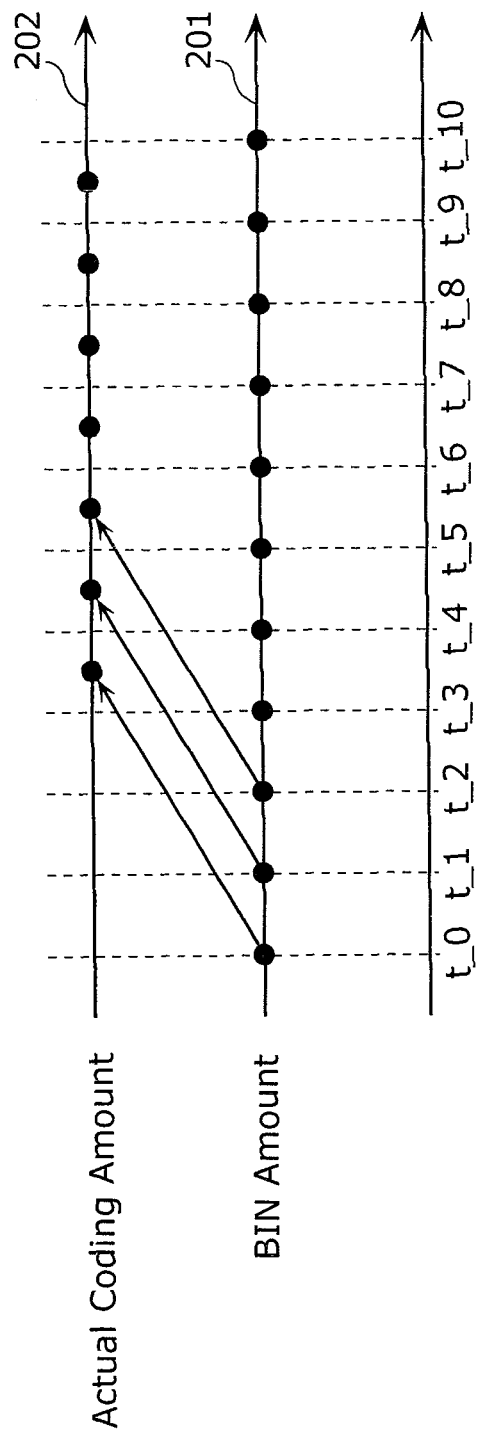
FIG. 4 is a chart showing an example of timings of being notified of BIN amounts and actual coding amounts according to the embodiment of the present invention.

FIG. 4 is a chart showing an example of timings of being notified of BIN amounts and actual coding amounts according to the present embodiment.

In FIG. 4, a number line 201 shows timings for being notified of BIN amounts, while a number line 202 shows timings for being notified of actual coding amounts. In this example, it is seen that, at a timing t_4 when a BIN amount of a picture {4} is notified, actual coding amount(s) of picture(s) up to a picture {0} have been notified.

In this case, the buffer 104 is controlled to accumulate BIN amounts of pictures {1} to {4}. For example, this can be achieved in the following way. When the binarization unit 101 and the arithmetic coding unit 102 output a BIN amount and an actual coding amount, respectively, these units also output time information {n} together. Then, when the buffer simulation unit 103 receives the actual coding amount with the time information {n} from the arithmetic coding unit 102, the buffer simulation unit 103 generates a control signal for controlling the buffer 104 to delete an entry of the BIN amount corresponding to the time information received with the actual coding amount.

Thereby, the buffer 104 holds BIN amounts of pictures that have been already processed by the binarization unit 101 but not yet been processed by the arithmetic coding unit 102.

In the above-described processing of the buffer 104, regarding a time period where an actual coding amount is known (being notified), the buffer simulation unit 103 updates an occupation amount of a buffer (hereinafter, referred to also as a "buffer occupation amount") $F\_i$, by using the actual coding amount as $b\_i$, according to Equations 1 and 2 previously presented in the explanation of the conventional technology.

After the time period, namely, during a time period where a next actual coding amount is not yet known, the buffer occupation amount $F\_i$ is updated by using BIN amount(s) accumulated in the buffer 104 as $b\_i$.

Figure 5:
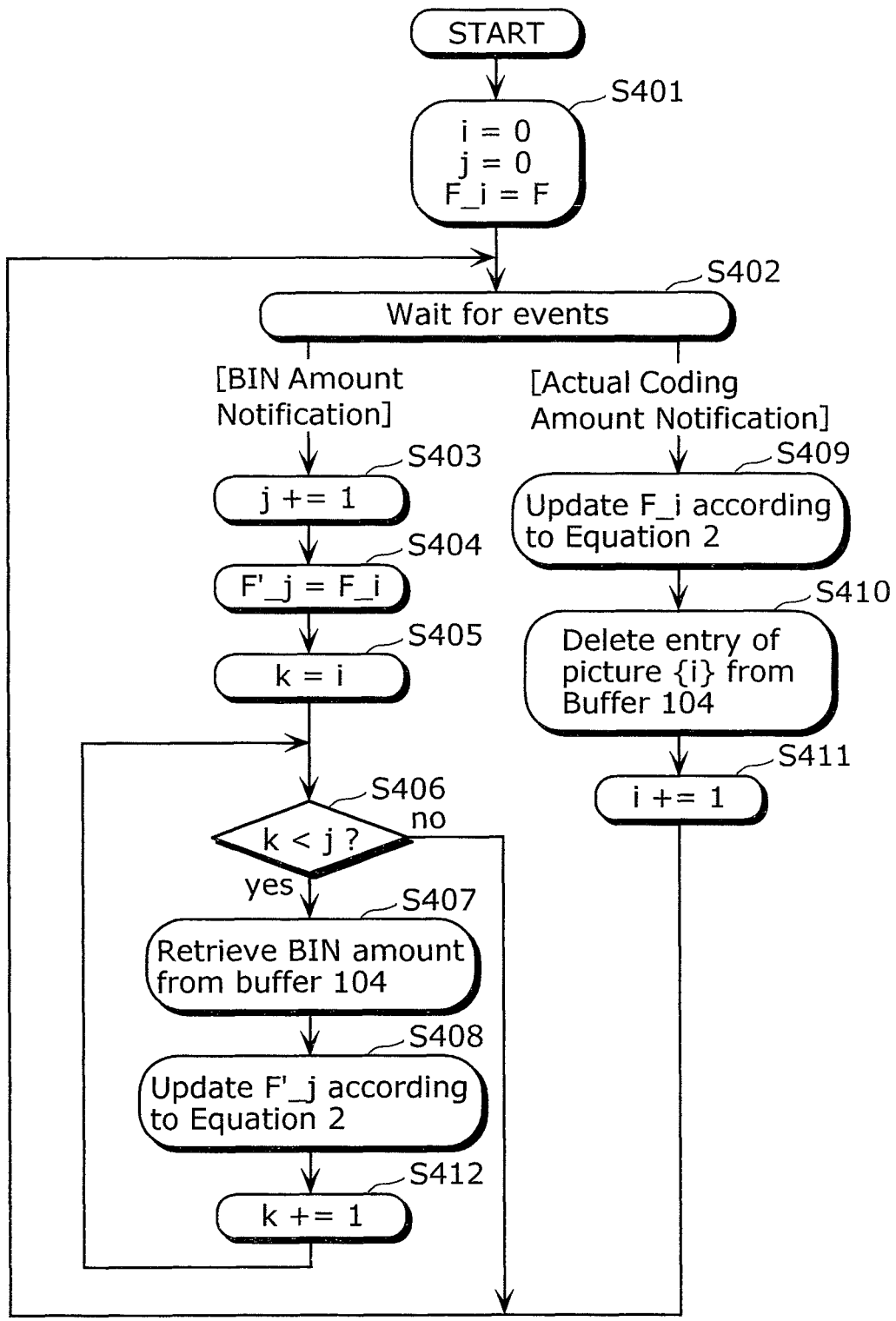
FIG. 5 is a flowchart of an example of a flow of processing performed by a buffer simulation unit according to the embodiment of the present invention.

The above-described processing of the buffer simulation unit 103 is shown in a flowchart of FIG. 5, for example.

FIG. 5 is a flowchart of an example of the flow of the processing performed by the buffer simulation unit 103 according to the present embodiment.

First, the buffer simulation unit 103 performs initialization (S401). Here, $F\_i$ denotes an occupation amount in buffer simulation using an actual coding amount. A variable i denotes a reference number of a picture corresponding to an actual coding amount that is notified next. A variable j denotes a reference number of a picture corresponding to a BIN amount that is notified next.

Next, the buffer simulation unit 103 waits for events (S402). This is because notification of a BIN amount from the binarization unit 101 and notification of an actual coding amount from the arithmetic coding unit 102 occur at different timings out of synchronization, and therefore the buffer simulation unit 103 needs to wait for the two events. When an actual coding amount is notified, $F\_i$ is updated according to Equation 2 by using the actual coding amount as $b\_i$ (S409).

Next, the buffer simulation unit 103 deletes an entry of a picture {i} from the buffer 104 (S410), then finally increases the variable i by only 1 (S411), and returns to the step of event waiting (S402).

On the other hand, when a BIN amount is notified, the buffer simulation unit 103 increases the variable j by only 1 (S403). Then, in the buffer simulation, the buffer simulation unit 103 calculates an occupation amount $F'\_j$ by using BIN amounts of pictures {i} to {j−1}, based on $F\_i$ as an initial value (S404 to S408).

The calculated $F'\_j$ represents an occupation amount obtained in buffer simulation by which an actual coding amount is used for pictures up to the picture {i} and BIN amount(s) are used for pictures {i+1} to {j−1}.

Here, in the BIN amount notification (S403 to S408 and S412), the variable $F'\_j$ is used as an occupation amount. This is because a real occupation amount $F\_i$ that is calculated using an actual coding amount has to be distinguished from a virtual occupation amount $F'\_j$ that is calculated using BIN amounts.

The following example is provided to facilitate understanding of the above flowchart.

As shown in FIG. 4, it is assumed that a BIN amount of a picture {4} is notified at a current timing t_4 in the situation where actual coding amounts of pictures up to a picture {0} are already known. In this case, $F\_i$ has a value calculated by using the actual coding amount of the picture {0}.

Furthermore, i=1, j=4, and at the step of increasing the variable j (S403)

j=5.

In addition, in the loop of S406, S407, S408, and S412, $F'\_j$ is updated according to Equation 2, by using BIN amounts of pictures {1} to {4} accumulated in the buffer 104 as $b\_i$.

The F'_j calculated in the above manner is a buffer occupation amount in consideration with pictures up to the picture {4}, and is a value to be used in rate control for a next picture {5}. In other words, for the picture {5}, a real coding amount is controlled to satisfy Equation 3, in other words, to set the real coding amount to be equal to or less than F'_j.

Figure 6:
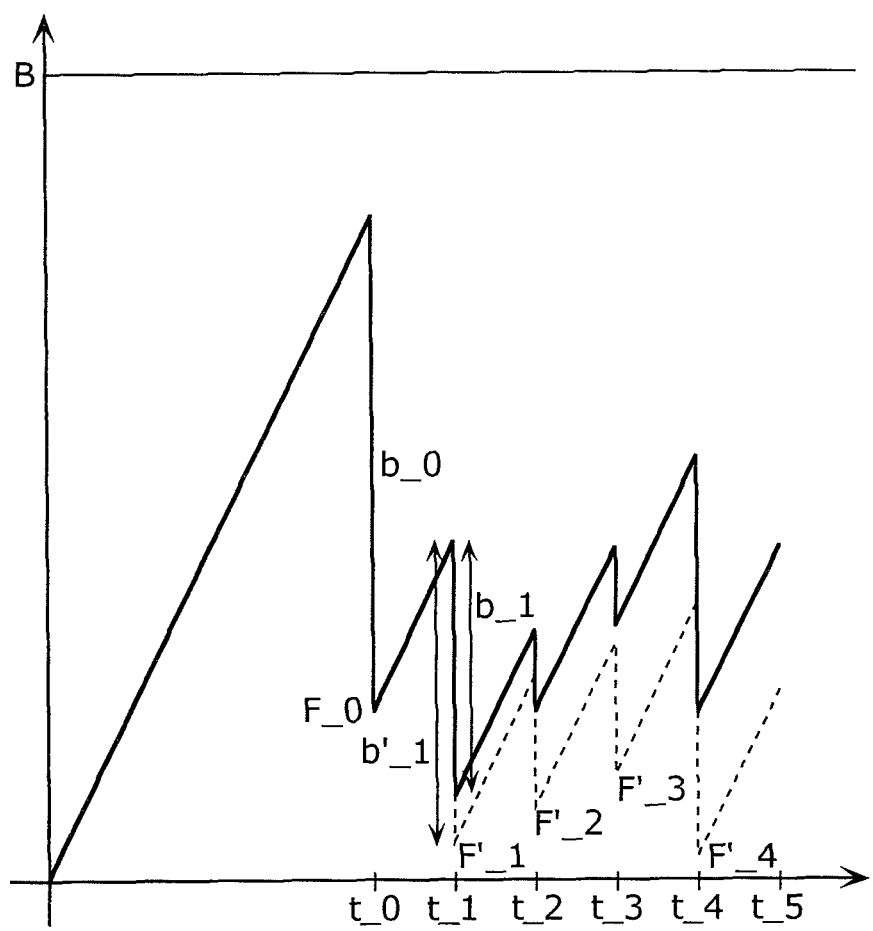
FIG. 6 is a graph plotting an example of a result of buffer simulation according to the embodiment of the present invention.

An example of a relationship between the variables used in the above explanation and a result of the buffer simulation is shown in FIG. 6. As shown in FIG. 6, at a timing t_4, a value of a buffer occupation amount F'_4 is less than a value of a real buffer occupation amount F_{4}. Here, a solid line shows shift of the real buffer occupation amount, while a dotted line shows shift of the virtual buffer occupation amount calculated using BIN amounts.

Here, it is the most important that, since there is a general relationship of BIN amount > actual coding amount, a value of a buffer occupation amount F'_n calculated by using BIN amounts is less than a value of a real buffer occupation amount F_n. Then, the rate control unit 1006 performs control to suppress a real coding amount with reference to such a small value of F'_n, in order not to cause underflow of a buffer, in other words, in order to satisfy Equation 3. Thereby, it is possible to surely prevent underflow of a buffer in terms of the real buffer occupation amount.

For example, in FIG. 6, when the binarization unit 101 have already processed pictures up to the picture {4}, a value of F'_5 is calculated using Equation 2. Then, according to Equation 3, an upper limit of a real coding amount of the next picture {5} is determined. In other words, rate control is performed by using F'_5 as an upper limit. As explained previously, since F'_5<F_5, a relationship among a real coding amount of the picture {5}, F'_5, and F_5 is determined as the following.

Real Coding Amount of Picture {5}<F'_5<F_5

This relationship equation satisfies Equation 3. In other words, this relationship equation can prevent underflow.

The present embodiment as described above does not cause noncompliance with conformance due to buffer underflow, and thereby can provide a video coding device which can generate coded data that does not cause discontinuity in video in a decoder.

Furthermore, buffer simulation is performed using an actual coding amount for a section in which the actual coding amount is already known. Therefore, an error of the buffer simulation does not have a large value. As a result, it is possible to prevent excessive control on coding amounts.

It should be noted that it has been described in the present embodiment that a BIN amount, namely, a per-picture coding amount of codes generated in binarization in lossless coding in H.264, is used as an intermediate result of compression coding.

However, it is also possible to use any value except the BIN amount as an intermediate result of compression coding, if the conditions that a length of the value is always longer than a length of an actual coding amount is satisfied. It should also be noted that an estimation coding amount disclosed in the conventional technologies may be used instead of a BIN amount. However, in this case, the estimation method needs to satisfy the conditions that a length of an estimation coding amount is longer than a length of an actual coding amount.

Industrial Applicability

The video coding device and the video coding method according to the present invention provides processing satisfying restriction defined by a standard, in other words, provides a mechanism that prevents underflow of a buffer.

The video coding device and the video coding method according to the present invention can satisfy restriction defined by a standard, even if there is performance characteristic by which a code length is notified after one picture delay due to restriction caused by circuit implementation regarding CABAC employed in H.264 standard.

As described in the embodiment of the present invention, if the restriction defined by a standard is not satisfied, phenomenon, such as discontinuity in reproduced video, occurs in reproducing compressed video. Such phenomenon is unacceptable in product performance. With the effects of preventing such phenomenon, the present invention has a high industrial applicability.

The invention claimed is:

1. A video coding device that performs compression coding on pictures included in video signals to generate coded pictures, the video coding device comprising:
    a coder configured to perform the compression coding by performing at least orthogonal transformation, quantization, binarization, and arithmetic coding per picture of the pictures included in the video signals to generate a second code length that is a code length per picture actually outputted from the video coding device; and
    a calculation unit including a processor configured to calculate an occupation amount of a virtual buffer to be used for controlling a coding amount by simulating a temporal change in the occupation amount, the simulation being performed using a first code length that is a code length obtained before the coder performs the arithmetic coding, the virtual buffer virtually expressing an accumulation amount of a decoder buffer to be used in a decoder,
    wherein the processor of the calculation unit is configured, for a picture of the pictures, to:
        (i) until the second code length corresponding to the first code length is generated, add the first code length to a current occupation amount of the virtual buffer to determine the occupation amount of the virtual buffer, and set a parameter to be used in the quantization based on the determined occupation amount of the virtual buffer; and
        (ii) when the second code length corresponding to the first code length is actually generated, replace (a) the first code length corresponding to the actually generated second code length among code lengths added for the virtual buffer with (b) the actually generated second code length that is shorter than the first code length to re-determine the occupation amount of the virtual buffer, and set the parameter to be used in the quantization based on the re-determined occupation amount of the virtual buffer, and
    wherein the occupation amount includes the current occupation amount and the first or second code length, such that only a portion of the occupation amount is replaced when the second code length corresponding to the first code length is generated.

2. A video coding method of performing compression coding via a video coding device on pictures included in video signals to generate coded pictures, the video coding method comprising:
    performing the compression coding by performing at least orthogonal transformation, quantization, binarization, and arithmetic coding per picture of the pictures included in the video signals to generate a second code length that is a code length per picture actually outputted from the video coding method; and
    calculating an occupation amount of a virtual buffer to be used for controlling a coding amount by simulating a temporal change in the occupation amount, the simulation being performed using a first code length that is a code length obtained before the performing of the compression coding performs the arithmetic coding, the virtual buffer virtually expressing an accumulation amount of a decoder buffer to be used in a decoder, wherein the calculating further includes, for a picture of the pictures, (i) until the second code length corresponding to the first code length is generated, adding the first code length to a current occupation amount of the virtual buffer to determine the occupation amount of the virtual buffer, and setting a parameter to be used in the quantization based on the determined occupation amount of the virtual buffer, and (ii) when the second code length corresponding to the first code length is actually generated, replacing (a) the first code length corresponding to the actually generated second code length among code lengths added for the virtual buffer with (b) the actually generated second code length that is shorter than the first code length to re-determine the occupation amount of the virtual buffer, and setting the parameter to be used in the quantization based on the re-determined occupation amount of the virtual buffer, and wherein the occupation amount includes the current occupation amount and the first or second code length, such that only a portion of the occupation amount is replaced when the second code length corresponding to the first code length is generated.

* * * * *